Oct. 28, 1969   R. D. FULKERSON   3,474,655
METHOD OF CUTTING PANELS
Filed May 17, 1967
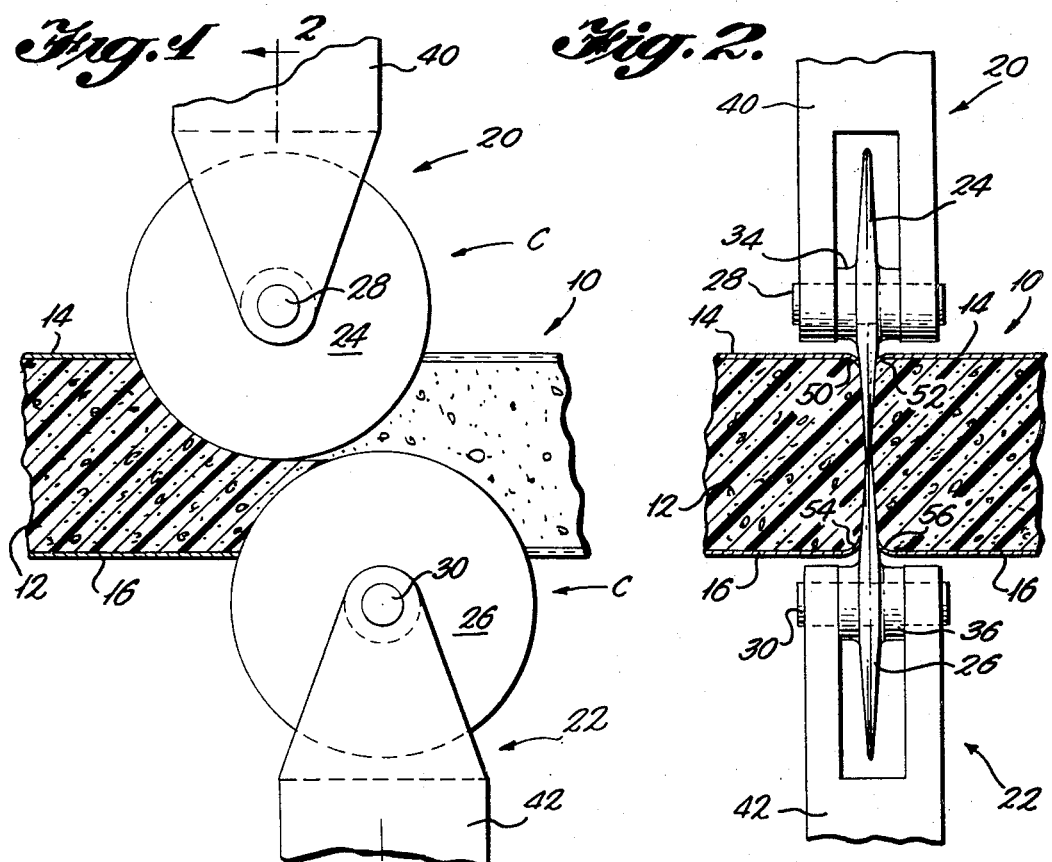
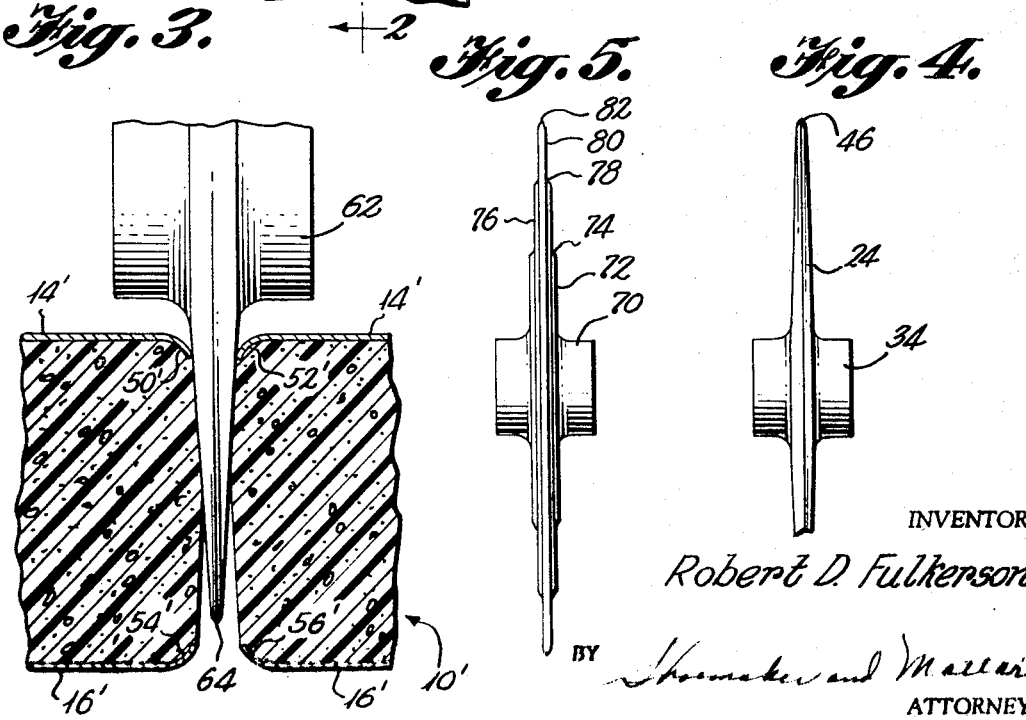
INVENTOR
Robert D. Fulkerson
BY
ATTORNEYS

United States Patent Office 3,474,655
Patented Oct. 28, 1969

3,474,655
METHOD OF CUTTING PANELS
Robert D. Fulkerson, Kansas City, Mo., assignor to Butler Manufacturing Company, Kansas City, Mo., a corporation of Missouri
Filed May 17, 1967, Ser. No. 639,227
Int. Cl. B21b 47/00; B28b 7/14
U.S. Cl. 72—327                                         8 Claims

ABSTRACT OF THE DISCLOSURE

A sandwich panel is provided having a central core portion with a bendable skin portion on opposite faces thereof. One or more cutter means is provided comprising a circular rolling knife tapered from an inner portion thereof to a thin outer cutting edge The taper may either be smooth or stepped. The cutter knife is moved longitudinally along the panel so as to cut the skin portion and then progressively cut the core portion inwardly thereof while forcing the cut edges of the skin portion inwardly into the core portion so as to simultaneously form rounded edges on the cut skin portions. This cutting may be carried out by a single cutter knife successively employed on opposite sides of the panel, or two cutter knives may be moved along the panel, one in advance of the other to simultaneously cut the panel from opposite sides thereof.

BACKGROUND OF THE INVENTION

The present invention relates to a method of cutting sandwich panels and the like having relatively rigid skin portions and a core portion disposed therebetween.

The method of the present invention is directed to the cutting of sandwich panels such as those having steel or aluminum skin portions with a cellular plastic core. The method may also be employed with sandwich panels having a plastic skin and a rigid or semi-rigid core where it is not feasible to back up the skin in the conventional manner for shearing.

The method is particularly adapted for use in all applications wherein it is necessary or desirable to provide a smooth rounded cut edge on the skin portions of the panel. Additionally, the method may be employed with sandwich panels having raised ribs thereon to reinforce the panel.

In the prior art, sandwich panels have been cut by means of an abrasive wheel or a metal cutting saw. A principal disadvantage of such prior art methods of cutting is the fact that they produce sharp edges, burrs and chips which are hazardous to personnel handling the panels, and furthermore, it is difficult to prevent such panels cut in this manner from scratching adjacent panels during stacking and shipping thereof.

The prior art methods of cutting such panels are not economical since the abrasive wheels employed will wear out rapidly and must be replaced, while saw blades employed for cutting such panels soon become dull and must be re-sharpened or replaced.

Known methods of cutting sandwich panels are additionally disadvantageous since they produce excessive noise and both the rotation and movement of the saw or blades must be powered. Furthermore, such methods create dangerous conditions for the operator since the cutter means is both quite sharp and hot and metal chips from the cutting operation may strike the operator. The heat produced in such cutting operations also often melts or damages the foam core portions thereof.

SUMMARY OF THE INVENTION

In the method of the present invention, the cutting is carried out by circular rolling knives tapering from an inner portion thereof to outer cutting edges. As these cutter knives move along the panels, they cut the skin portion and the adjoining core portions while simultaneously rolling down the cut edges of the skin portions to form a smooth rounded edge.

Accordingly, when employing the method of the present invention, a smooth rounded edge is provided on the skin portions, and sharp edges, burrs and chips are eliminated.

Additionally, the rolling knives are used in the method of the present invention initially cost much less than a saw blade or an abrasive wheel as used in the prior art, and furthermore, the rolling knives are not sharp to begin with and can be used for a much longer time before replacement is necessary than an abrasive wheel or saw blade.

The method of the present invention substantially reduces the noise involved in the cutting operation and the rolling knives need not be powered. The danger to the operator from the cutter means is minimal, and flying metal chips are substantially eliminated. The amount of heat generated during the cutting operation is also much less than that of prior art methods so that the foam core portions will not tend to melt or be damaged.

An object of the present invention is to provide a new and novel method of cutting panels having a core portion and hendable skin portions which avoid sharp edges, burrs and chips, and wherein the initial cost of the cutter means is less than that as employed in the prior art, and further wherein the cutter means has a greater life expectancy.

BRIEF DESCRIPTION OF THE DRAWING

FIG. 1 is a sectional view illustrating a sandwich panel being cut according to the method of the present invention;

FIG. 2 is a sectional view taken substantially along line 2—2 of FIG. 1 looking in the direction of the arrows;

FIG. 3 is an enlarged sectional view similar to FIG. 2 illustrating the manner in which a panel can be cut by a single cutter knife;

FIG. 4 is a view illustrating one form of cutter knife according to the present invention; and FIG. 5 is a view illustrating a modified form of cutter knife according to the present invention.

DESCRIPTION OF THE PREFERRED EMBODIMENTS

Referring now to the drawings wherein like reference characters designate corresponding parts throughout the several views, a typical sandwich panel is indicated generally by reference numeral 10 in FIGS. 1 and 2, the sandwich panel including a core portion 12 which may comprise a cellular plastic substance, bendable skin portions 14 and 16 being disposed on opposite faces of the core portion, these skin portions typically being formed of steel or aluminum and the like. While a particular sandwich panel has been described herein, it is apparent that the sandwich panel may be of many different constructions as commonly employed in the art.

A pair of cutter means are indicated generally by reference numerals 20 and 22 respectively. The two cutter means include cutter knives 24 and 26 which are journalled on shafts 28 and 30 respectively.

Cutter knives 24 and 26 include integral hub portions 34 and 36 which are received between and maintain the cutter knives centered between the spaced legs of support members 40 and 42 respectively. The outer ends of each of the spaced legs of the two support members are provided with aligned holes for receiving the shafts 28 and 30.

Referring now to FIG. 4 of the drawings, the construction of cutter knife 24 is more clearly illustrated, it being understood that the construction of cutter knife 26 is identical therewith. The two cutter means comprise circular rolling knives which as seen especially in FIG. 4 taper from an inner portion thereof to a thin outer cutting edge 46. As seen in FIG. 4, the cutter knife has a smooth tapered configuration from an inner portion thereof to the outer cutting edge.

Referring again to FIG. 1 of the drawings, the two cutter knives 24 and 26 are moved in the direction of arrows C to carry out the cutting operation with respect to the associated panel. It will be noted that one of the cutter knives, in this instance cutter knife 24, is moved in advance of cutter knife 26 since the lower cutting edge of knife 24 extends slightly below the upper cutting edge of knife 26, and these cutting edges would interfere with one another if one of the cutter knives were not in advance of the other. By having a slight overlap in these cutting edges, full cutting of the core portion is assured.

In some cases, it may be desirable not to cut all the way through the core portion of the panel and in such a case, the cutting edges of the cutter knives may not have an overlap. The core portion will readily separate over small spans to enable this arrangement. The cutter may also be displaced sidewise to produce a step type of end. Here again, the core portions will separate over a small uncut span if this type of arrangement is desired.

It is apparent that as the cutter knives move along the panel as seen in FIG. 1, the thin outer cutting edges of the knives will initially cut the skin portions whereupon as the knives move longitudinally, the thicker portions of the cutter knives will be progressively moved into the cut so as to cut the core portion inwardly of the skin portion and substantially simultaneously roll down the edges of the cut portions of the skin portion to form a smooth rounded edge thereon.

As seen most clearly in FIG. 2, the cut edges of skin portion 14 will be rolled down to form the smooth rounded edge portions 50 and 52, while the cut edges of skin portion 16 will be rolled down and inwardly into the core to provide the smooth rounded edge portions 54 and 56.

Referring now to FIG. 3 of the drawing, a sandwich panel 10' is provided substantially identical with the sandwich panel 10 previously described, and similar portions of this panel have been given the same reference numerals primed as the corresponding portions of the structure shown in FIG. 2.

In this form of the invention, a cutter knife 60 is provided having an enlarged hub 62. The cutter knife tapers from an inner portion thereof to a thin outer cutting edge 64 so as to have a configuration similar to that shown in FIG. 4.

In the arrangement shown in FIG. 3, the cutter knife may have a dimension so as to cut substantially more than one-half the thickness of the panel. Accordingly, the cutter knife may first be moved along one side of the panel, and then subsequently moved along the opposite side of the panel thereby completing a cut entirely through the panel and forming the desired smooth rounded edge portions 50', 52', 54' and 56' on the cut edges of the skin portions of the panel.

Referring now to FIG. 5, a modified form of cutter knife which may be employed in the present invention is illustrated. As seen in this figure, the cutter knife includes an enlarged hub portion 70. A first radially outwardly extending annular portion 72 is provided of a particular thickness which then is stepped-down along a portion 74 to a further annular portion 76 of less thickness. Portion 76 then joins with a stepped-down portion 78 which joins with a further annular portion 80 of still less thickness. Portion 80 in turn has a tapered outer portion which terminates in a thin outer cutting edge 82.

It is apparent that the cutter knife as shown in FIG. 5 will perform substantially the same function as the cutter knife previously described the only difference being that the cutter knife as seen in FIG. 5 is not smoothly tapered from an inner portion to the outer cutting edge thereof, but is tapered in a stepped fashion to the outer cutting edge. This stepped, tapered configuration of the cutter knife will serve to perform the same function as the cutter knife previously described.

It is apparent from the foregoing that there is provided according to the present invention a new and novel method of cutting a panel having a relatively rigid skin portion and an adjacent core portion wherein a smooth rounded edge is provided on the cut portions of the skin portion so as to avoid sharp edges, burrs and chips, and further wherein the initial cost of the cutting means is less than that of the prior art and further wherein the cutter means has a longer life expectancy than those employed in the prior art.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. The method of cutting a panel having a bendable skin portion and an adjoining core portion, comprising initially cutting said skin portion, then progressively cutting the adjoining core portion while simultaneously forcing the cut edges of the skin portion inwardly toward the core portion and thereby forming a smooth rounded edge on the cut skin portions.

2. The method as defined in claim 1 including the step of providing a cutter means including a cutter blade tapering from an inner portion thereof to a thin outer cutting edge, the initial cutting of said skin portion being accomplished by forcing said thin outer cutting edge through said skin portion, the cutter blade then being progressively moved into the initial cut portion so that the progressively thicker portions of the cutter blade will produce said rounded edges on the cut portions of the skin portion.

3. The method as defined in claim 2 wherein said cutter means comprises a rolling knife, said rolling knife being moved along said panel to produce the desired cutting action.

4. The method as defined in claim 2 wherein said panel includes two bendable skin portions on opposite sides of said core, providing a second cutter means similar to said first cutter means, and cutting the skin portions at opposite sides of the panel substantially simultaneously with said first and second mentioned cutter means.

5. The method as defined in claim 4 wherein each of said cutter means comprises a rolling knife, said rolling knives being moved along opposite sides of said panel to carry out the cutting operation, one of said cutter knives being moved in advance of the other of said cutter knives.

6. The method as defined in claim 2 wherein said cutter knife is provided with a smooth tapered configuration from an inner portion thereof to said outer cutting edge.

7. The method as defined in claim 2 wherein said cutter knife is provided with a stepped, tapered configuration from said inner portion thereof to the outer cutting edge thereof.

8. The method as defined in claim 1 wherein said panel includes two bendable skin portions on opposite faces of said core portion, providing a second cutter means, each of said cutter means comprising a substantially circular rolling knife, each of said knives tapering from an inner portion thereof to a thin outer cutting edge, said cutting operation being carried out by moving said cutter knives along opposite sides of said panel so as to substantially simultaneously cut the skin portion at opposite sides of the panel and to roll down the cut edges of the skin portions to provide a rounded edge thereon.

References Cited

UNITED STATES PATENTS

| | | | |
|---|---|---|---|
| 1,313,054 | 8/1919 | Berry | 29—155.59 |
| 1,850,327 | 3/1932 | Makowski | 25—105 |
| 3,266,088 | 8/1966 | Schenck et al. | 18—2 |

CHARLES W. LANHAM, Primary Examiner

L. A. LARSON, Assistant Examiner

U.S. Cl. X.R.

72—186, 363; 264—163